United States Patent Office 3,174,733
Patented Mar. 23, 1965

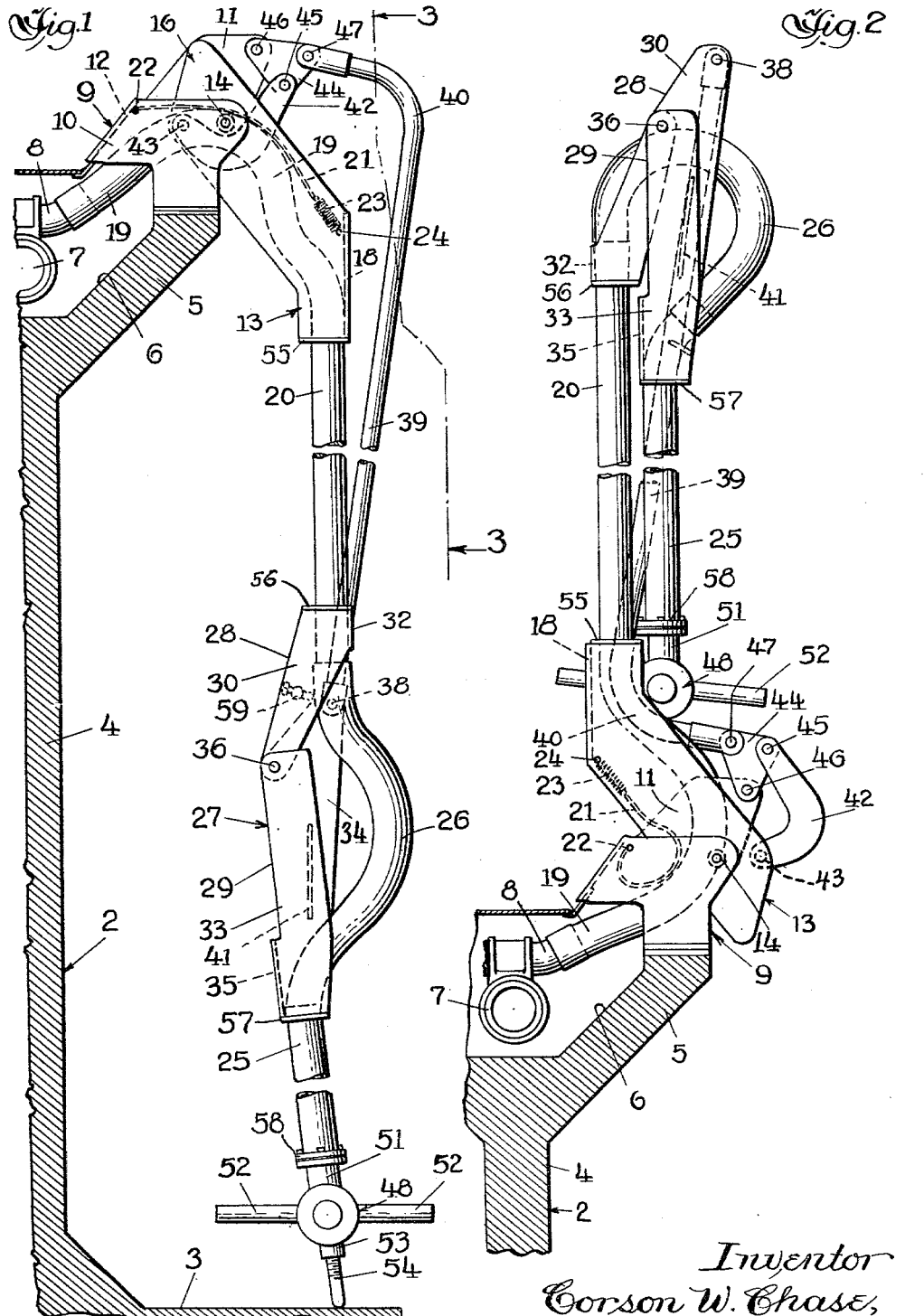

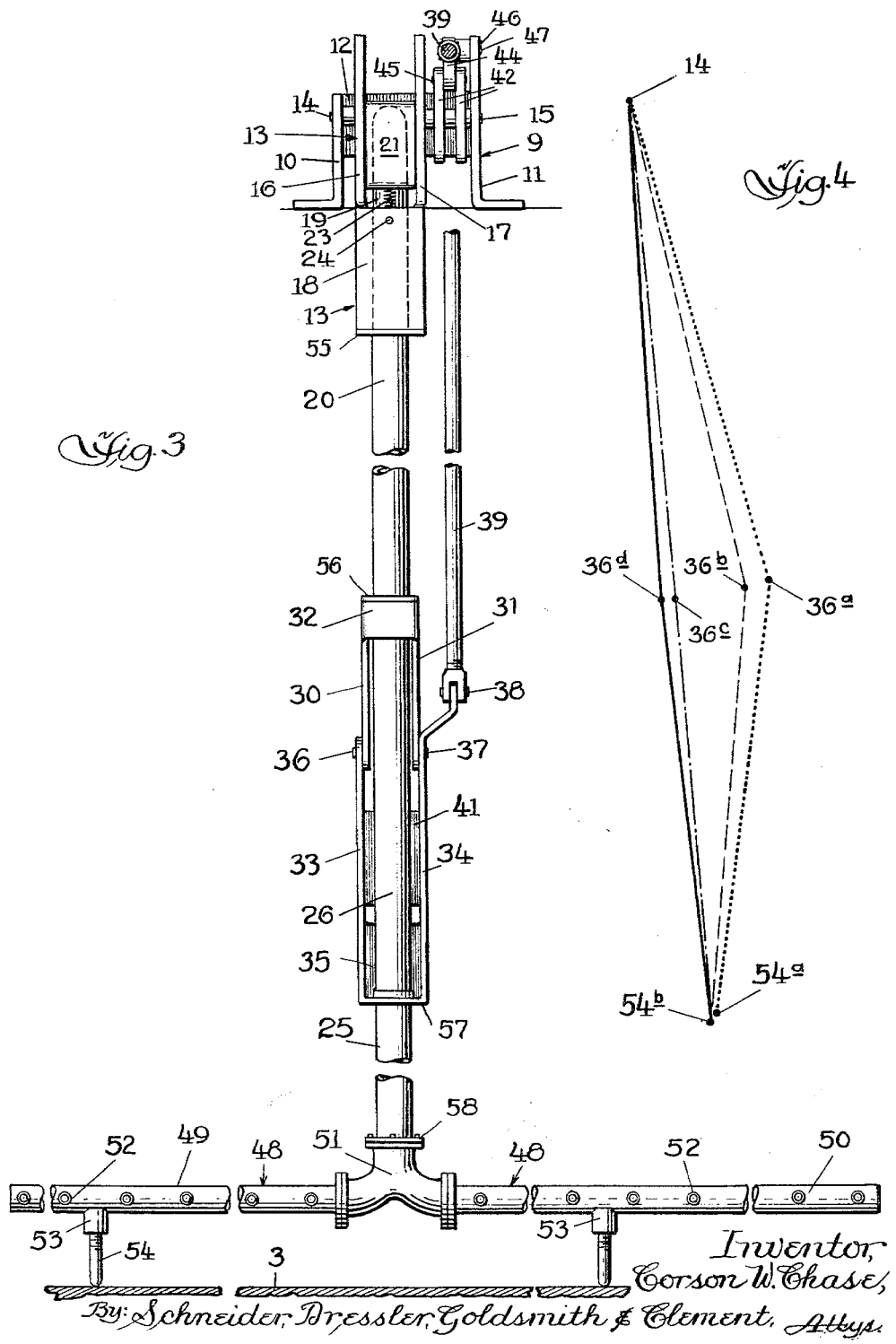

3,174,733
SWING DIFFUSER
Corson W. Chase, Oak Park, Ill., assignor to FMC
Corporation, a corporation of Delaware
Filed Apr. 14, 1961, Ser. No. 103,121
13 Claims. (Cl. 261—124)

The present invention relates to a swing diffuser, and is particularly concerned with a piping and linkage arrangement by means of which the aeration of liquids, such as sewage, in a tank is accomplished more efficiently than possible with previously known apparatus.

Heretofore diffuser headers have been limited to a length of approximately sixteen feet because of the excessive weight of units of greater length, and because the loss of air pressure due to air friction made it uneconomical to supply proper air pressure throughout the length of longer units. Very large quantities of air are required for treatment in large sewage treatment plants. The cost of compressing air is, next to the cost of labor, usually the largest operating cost. Since cost of compressing air is approximately proportional to the compressed pressure, any increased air pressure required at the compressor, due to frictional flow loss between the compressor and the header, increases both operating costs and the original cost of air compressing equipment. Swing diffusers heretofore used comprise two hanger pipes and a stationary header. The structure of such diffusers is characterized by pivotal connections between the two hanger pipes and between the upper hanger pipe and the stationary header. The air friction is caused in large part by the sharp right angle bends in the direction of air flow at these pivotal connections.

In accordance with the present invention the pivotal connections are replaced by flexible tubes that reduce the total weight of the swing diffuser to a considerable extent, and also provide flexible hinges that permit the air to flow smoothly from the air main to the T at the header in a single vertical plane, thereby eliminating a substantially large pressure loss due to air friction in the joints of the diffuser. The decrease in weight and the reduction in pressure loss permit the use of diffuser headers of approximately twice the maximum length heretofore used. The use of longer headers permits the diffusion of more air from each swing assembly and therefore fewer swing assemblies are required in a tank. The use of less swing assemblies per tank reduces both the cost of installation and the maintenance cost for the diffuser equipment.

The flexible tubes also eliminate the need for expensive machining of mechanical joints. It is necessary to precisely machine the pivotal joints in swing diffusers heretofore used because of the need for maintaining an air seal at said joints. The flexible tubes can be sealed to the ends of pipes without requiring the pipe surfaces to be machined.

Guide members cooperate with the hanger pipes to restrict the movement of said hanger pipes to a single vertical plane. A rigid control bar connecting the swing joint and the joint between the upper and lower hanger pipes controls the relative positions of the upper and lower hanger pipes during the movement of the hanger pipes between their upper and lower positions. For convenience, the term "upper hanger pipe" will refer throughout the specification to the hanger pipe that is uppermost when the diffuser is in operative position with the diffuser header in its lowermost position, and the term "lower hanger pipe" will always refer to the hanger pipe that is lowermost in said operative position.

A linkage connecting the upper end of the control bar to the upper end of the upper hanger pipe is arranged to prevent the control arm and the upper hanger pipe from crossing each other until after the diffuser header is raised above the liquid level of the tank. If the diffuser header is out of the liquid when the control arm and upper hanger pipe cross, the weight of the unit will cause the various members to move in the proper direction. If the above mentioned crossing takes place while the diffuser header is still immersed in the liquid of the tank, the buoyancy of the header, together with forces exerted by fluid currents in the tank, may cause the members to move in the wrong direction from the dead center position, with the result that when the upper hanger pipe is in its uppermost position, the lower hanger pipe will not be swung into the proper position for servicing the diffuser header.

The diffuser header is provided with depending legs that support the header against sagging and also oppose any lateral forces exerted against it. The legs also cooperate with the hanger pipes to produce a toggle action that locks the diffuser header against possible displacement caused by forces exerted by buoyancy of the header and by currents existing in the tank and caused by the violent turbulence of the rising bubbles of air from the diffusers, while it is in operative position adjacent the bottom of the tank. The linkage is so arranged that the supporting legs depending from the diffuser header are poised above their final bearing points just prior to the final downward movement of the assembly, and the final increment of movement of each leg to its bearing point is vertical, with no lateral component. This arrangement avoids any dragging or scraping of the supporting legs on the floor of the tank.

The lower end of the supporting legs moves into bearing contact with the floor of the tank before the upper hanger pipe reaches its lowermost position. The downward movement of the upper hanger pipe does not terminate with the movement of the legs of the diffuser header into contact with the floor of the tank. The continued downward movement of the upper hanger pipe, after the legs of the diffuser header are in bearing contact with the floor of the tank, moves the pivot of the knee joint laterally past the dead center line extending from the fixed pivot at the upper end of the upper pipe hanger to the bearing point of the legs against the floor of the tank.

The length of the apparatus from the upper fixed pivot to the bottom of the legs is significantly longer than the distance from the same pivot to the point at which the legs bear on the bottom of the tank. The length of the diffuser header imparts a slight flexibility to the diffuser header, and the lateral movement of the knee joint causes the sections of the diffuser header adjacent the legs to raise slightly to accommodate the excess length of the apparatus and to permit a toggle action that carries the pivot of the knee joint and the axial center of the diffuser header past the dead center. When the pivot of the knee joint is moved past dead center the lower end of each leg is fixed in its bearing position and is forced upward by the considerable force exerted by the floor of the tank necessary to flex upwardly the diffuser header. The legs cannot be displaced from their bearing positions by lateral force exerted against the diffuser nor by upward buoyant force exerted by the displacement of fluid by the header and diffuser tubes, nor by upward force due to upward currents of fluid induced by the stream of aerating bubbles. Any lateral force applied against the header, as, for example, by the current flow of the liquid in which it is immersed, merely causes the legs to dig into the floor and hold them tighter against displacement. The legs can be released from holding position only by an upward movement of the diffuser header.

The flexible tubes providing the connection between the upper hanger pipe and the air source and between the upper and lower hanger pipes are preferably plastic or elastomeric. The tube connecting the upper hanger pipe to the source of air is provided with a shield that prevents it from buckling too sharply in the center of its bend and also protects it from deterioration due to the sun's rays.

The structure by means of which the above noted and other advantages of the invention are attained will be described in the following specification taken in conjunction with the accompanying drawings, showing a preferred embodiment of the invention, in which:

FIG. 1 is a fragmentary side elevational view of a swing diffuser embodying the invention, with the diffuser in its lowermost or operating position;

FIG. 2 is a view, similar to FIG. 1, showing the diffuser in its uppermost or servicing position;

FIG. 3 is a fragmentary front elevational view showing the diffuser in its lowermost position, with a portion of the control bar sectioned along the line 3—3 of FIG. 1 to facilitate illustration of the linkage; and FIG. 4 is a diagrammatic chart showing the relative positions of the various pivots of the diffuser apparatus as the diffuser is being moved to its lowermost position.

Referring to the drawings, a tank 2 comprising a floor 3 and a plurality of vertical walls 4 has a coping 5 extending from the upper edge of one vertical wall to provide a groove 6 in which an air main 7 is positioned. Air main 7 is provided with an outlet 8 extending toward the upper edge of the coping. The specific arrangement of the air main is merely illustrated as an example of a suitable structure for use with the swing diffuser, and it will be understood that neither the structure of the tank nor the specific arrangement of the air main is considered to constitute any part of the invention.

A stationary anchor member 9 is mounted in fixed position on the upper edge of coping 5 adjacent outlet 8. The anchor member 9 is shown fixed to coping 5 by being imbedded in the concrete forming the wall, but may be fixed by various means. The anchor member is preferably formed of metal plates, but may be cast or molded of any suitable material. As shown in the drawings, anchor member 9 comprises two side walls 10 and 11 connected at one side by an integral bridge member 12. The lower edge of bridge member 12 is located in a horizontal plane above the horizontal plane of the upper edge of the coping and is spaced on the side of anchor member 9 closest to the outer wall of the tank.

A guide member in the form of a bridle 13 is pivotally secured to anchor member 9 by pins or studs 14 and 15. Bridle 13 is a rigid assembly comprising side walls 16 and 17 connected by an integral bridge member 18 and a plate 55 at the lower ends of the side walls. Pin 14 extends through side walls 10 and 16, and pin 15 extends through side walls 11 and 17 to provide a fixed pivot for bridle 13 which moves pivotally in a vertical plane. Bridge member 18 extends approximately vertically on the side of bridle 13 most remote from coping 5 when the diffuser is in its lowermost position.

A flexible tube 19 has one end sealed to outlet 8 and its other end sealed to the upper end of an upper hanger pipe 20 to form a flexible joint between the air main and the upper hanger pipe. Tube 19 may be made of any suitable plastic or rubber composition and may be reinforced, if desired. One example of a suitable material comprises nylon coated on both surfaces with neoprene. The reinforcement, if used, is preferably embedded in the nylon, and may comprise a helically wound wire or a plurality of wire rings spaced longitudinally of the tube. It is also possible to provide integral annular ribs as reinforcement for the tube. The reinforcement, if used, must not impair the flexibility of the tube. Flexibility is an essential characteristic of the tube because the tube must provide a flexible hinge for the upper end of the upper hanger pipe.

Upper hanger pipe 20 is in the same vertical plane as outlet 8, and tube 19 provides a passageway for a smooth flow of air from the outlet to the upper hanger pipe. The flexible tube extends between side walls 10 and 11 of anchor member 9 and between side walls 16 and 17 of bridle 13. Bridle 13 is rigidly attached to upper hanger pipe 20 in any suitable manner, as, for example, by welding. Anchor member 9 and bridle 13 cooperate to prevent lateral displacement of tube 19 and maintain it in the same vertical plane as outlet 8 and upper hanger pipe 20.

The end portion of flexible tube 19 adjacent outlet 8 extends over the upper edge of coping 5 between the side walls of anchor member 9. Bridge member 12 is spaced far enough from the edge of coping 5 to permit the flexible tube to extend through the space between the lower edge of bridge member 12 and the outer upper edge of coping 5.

A flexible shield 21, preferably of thin flexible metal, is mounted to engage one side of flexible tube 19. One end of the shield 21 is secured to a pin 22 secured to anchor member 9 adjacent the upper edge of bridge member 12. The other end of the shield is secured to a spring 23 which has its other end secured to bridge member 18, as indicated at 24. Shield 21 protects the flexible tube from the sun and also prevents it from bending too sharply. The control of the curvature of flexible tube 19 maintains a smooth passageway for the air and thereby minimizes air friction and reduces pressure loss as the air flows through the tube when the apparatus is in the lowermost or operating position.

The lower end of upper hanger pipe 20 is connected to the upper end of a lower hanger pipe 25 by a flexible tube 26 that forms a flexible knee joint. Flexible tube 26 and lower hanger pipe 25 are in the same vertical plane as upper hanger pipe 20 and flexible tube 19. Tube 26 is similar to tube 19 but does not require a shield such as shield 21, because it is not exposed to the sun continuously, as in the case of tube 19.

A pivoted guide member 27 provides means for controlling the movement of lower hanger pipe relative to the upper hanger pipe, and also prevents flexible tube 26 from being kinked when it is bent in either direction by the relative movement between the upper and lower hanger pipes. Guide member 27 comprises an upper section 28 and a lower section 29. Upper section 28 has two side walls 30 and 31 connected by an integral strip 32 adjacent their upper edges and an end plate 56. Side walls 30 and 31, strip 32 and plate 56 are fastened together and to pipe 20 by means such as welding. Bridle member 13, upper hanger pipe 20 and upper section 28 of guide member 27 therefore comprises a light but strong and rigid assembly having one end pivoted at 14, 15, and at the other end at 36, 37, by pivot pins spaced to insure lateral stability in the plane of FIG. 3. Lower section 29 of guide member 27 comprises side walls 33 and 34 connected by an integral strip 35 adjacent their lower edges and an end plate 57. An intermediate plate 41 secured to walls 33 and 34 provides additional stiffening of walls 33 and 34.

Side walls 33 and 34, strip 35 and plate 57 are fastened together rigidly to pipe 25 by means such as welding. A flange 58 is threaded or welded to the lower end of pipe 25. Therefore, lower section 29 of guide member 27 and hanger pipe 25 comprise a light, strong, and rigid assembly pivoted to the upper pipe assembly at 36 and 37. Pin 36 pivotally connects side walls 30 and 33 and pin 37 pivotally connects side walls 31 and 34.

Side wall 34 extends upwardly past pivot pin 37 and is pivotally connected, as indicated at 38, to the lower end of a rigid control bar 39. Control bar 39 is curved at approximately 90° adjacent its upper end, as indicated at 40. The upper end of control bar 39 is connected to anchor member 9 through a linkage, hereinafter described, that controls the upward movement of the lower hanger pipe relative to the upper hanger pipe to insure accessibility of the header for servicing it when it is in its uppermost position and to control the motion of the header legs as shown in FIG. 4.

The upper end of bridle 13 is pivotally secured to stationary anchor member 9 by pins 14 and 15 on each side of the anchor member. A curved link 42 is pivotally connected at one end to bridle 13 by means of a pin 43. The other end of link 42 is pivotally connected to one corner of a triangularly shaped link 44, as indicated at 45. The pivotal connection at 45 is a floating connection, since neither link 42 nor link 44 is fixed at that point. Another corner of link 44 is pivotally connected at 46 to stationary anchor member 9. The third corner of link 44 is pivotally connected to the upper end of control bar 39, as indicated at 47.

The swing assembly is moved from the position of FIG. 1 to the position of FIG. 2 by lifting force applied to the rigid upper pipe assembly by a hoist or any other suitable means. The upper pipe assembly, comprising upper hanger pipe 20, bridle 13 and upper section 28 of guide member 27, is swung upwardly about pivots 14, 15 in counterclockwise direction. The upward pivotal movement of the upper pipe assembly carries the lower pipe assembly upwardly, and, as the upper pipe assembly swings outwardly about its pivots 14, 15, the lower pipe assembly moves pivotally about pivots 36, 37 in clockwise direction.

A diffuser header 48, comprising two sections 49 and 50, is secured to the lower hanger pipe by means of a T-nipple 51 bolted to flange 58 at the lower end of lower hanger pipe 25. A plurality of air diffusers 52 mounted on diffuser header 48 are spaced longitudinally of the diffuser header. Although the showing in FIG. 3 indicates that air diffusers 52 extend laterally of the header, it will be understood that the air diffusers may be mounted on the diffuser header in any desired manner. The diffuser header has a length approximately twice the length of diffuser headers heretofore used. The added length of diffuser header is made possible by the use of the flexible tubes that eliminate the right angle bends of air passages through the pivotal connections between the pipe sections of other diffuser structures and reduce the air friction so that the air pressure is sufficient to provide uniform distribution of air throughout the length of the diffuser header.

Each diffuser header has an interiorly threaded socket 53 depending from the underside of each section 49 and 50, approximately midway of its length. A supporting leg 54 is threaded into each socket. The threaded connection between the supporting legs and the diffuser header provides means for adjusting the legs so that they can be set to bear against the floor of the tank with such force that the buoyancy of the header and upward forces due to upward flow of the fluid in the tank cannot raise the lower end of the leg from its bearing upon the floor of the tank. The supporting legs, therefore, bear with considerable force upon the floor of the tank and so oppose lateral and longitudinal forces caused by currents in the tank. If desired, cables may extend from the diffuser header to the coping to prevent the header from swaying parallel to the adjacent wall.

The linkage 14, 15 and 42–47, inclusive, is so arranged that when upper hanger pipe 20 is raised pivotally about pivot 14, 15, pins 36, 37, acting on pivoted member 29, lift lower hanger pipe 25. During upward movement of the swing diffuser the control bar 39, acting upon the lower hanger pipe assembly through pin 38 controls the angle of pipe 25 and opposes any overturning effect of the buoyancy and current forces on the header. Control bar 39 causes the lower hanger pipe to remain generally vertical but somewhat inclined as shown by line 36a–54a throughout the upward movement of the swing diffuser. In the uppermost position of the diffuser, as shown in FIG. 2, pivoted guide member 27 has moved pivotally through approximately 180°. The curved section 40 of control bar 39 provides clearance for the diffuser header so that it is accessible for servicing operations.

In moving between the lowermost position, shown in FIG. 1, and the uppermost position, shown in FIG. 2, the pivot points 36, 37, 38, 14, 15, and 47 pass through an intermediate position in which they are all in alignment. At this point the weight of the lower hanger pipe and the diffuser header is sufficient to cause the lower header pipe to swing about its pivot 36 in the proper direction so that the diffuser header ultimately reaches the position of FIG. 2. However, if the diffuser header is immersed in the liquid when the pivot points become aligned, the buoyancy of the liquid may counterbalance the weight of the diffuser header and the lower hanger pipe, with the result that the lower hanger pipe might swing about its pivot in the opposite direction. Pivotal movement of the lower hanger pipe and the diffuser header in the wrong direction might cause control rod 39 to buckle or might damage the diffuser mechanism in some other manner. Accordingly, the linkage, 14, 15, and 42–47, inclusive, is so arranged that the pivot points 36, 37, 38, 14, 15, and 47 do not become aligned with each other until the diffuser header is clear of the liquid in the tank. Pin 47 moves counterclockwise about pivot 46 from the position shown in FIG. 1 to the new position shown in FIG. 2. The position of pin 47 in FIG. 2 is nearer the header in order to minimize the length of bend in control bar 39. Reduction in the length of bend reduces the bending movement in control bar 39 so that it becomes a stronger and more rigid connection between pivots 47 and 38. In moving down to the operating position, pivot 43 moves through and slightly beyond a line connecting pivots 44 and 14, 15, so that upward force exerted through pin 38 caused by buoyancy of the header and force exerted by the bottom of the tank bearing upon the legs produces a clockwise torque on plate 17 serving to lock it in the down position.

The movement of the supporting legs is shown diagrammatically in FIG. 4. In this figure the dot and dash line indicates the dead center line between the pivots 14 and 36c and the final bearing position 54b of the supporting leg 54. The dotted line indicates the position of the pivots 14 and 36a and the lower end 54a of the supporting leg 54 just before the supporting leg touches the floor of the tank. The dash line indicates the position of the pivot points 14 and 36b as the lower end of supporting leg 54 reaches its final bearing position 54b. It will be noted that the arrangement of the linkage causes the final increment of movement of supporting leg 54 to be essentially vertical so that it does not drag or scrape along the floor of the tank.

The lower end of supporting leg 54 reaches its final bearing point 54b prior to the completion of the downward movement of the upper hanger pipe. In this position the pivot point 36b of the knee joint is to the right of dead center, as shown in FIG. 4. As the upper hanger pipe continues its downward movement, the pivot point 36 moves through dead center position 36c and into position 36d. The slight flexibility of the diffuser header permits the sections of it adjacent each leg 54 to raise slightly as the pivot 36 of the knee joint moves past the dead center position 36c. This movement provides a toggle action that jams each leg against the floor of the tank so that any lateral force against the diffuser header will increase the holding force of the legs, and the buoyancy of the liquid cannot raise the diffuser header when it is immersed. An adjustable stop screw 59 mounted on side wall 31 engages one edge of side wall 34 to prevent movement of pivot 36 beyond position 36d. When the upper hanger pipe is raised about its pivot 14, 15, the initial movement of leg 54 is vertically upward, with the result that there is no interference with the upward movement of the diffuser header.

While I have described a preferred embodiment of the invention in considerable detail, it will be understood that the description thereof is intended to be illustrative, rather than restrictive, as many details of construction may be modified or changed without departing from the spirit or scope of the invention. Accordingly, I do not desire to be restricted to the exact construction described.

I claim:

1. A swing diffuser comprising a source of air under pressure, a rigid upper hanger pipe connected to said source of air under pressure, said upper hanger pipe and its connection to said source of air being coplanar in a vertical plane, a fixed pivot, means pivotally connecting said upper hanger pipe to said fixed pivot for pivotal movement in said vertical plane, a rigid lower hanger pipe, a flexible tube connecting the upper end of said lower hanger pipe to the lower end of said upper hanger pipe, said flexible tube being coplanar with said upper and lower hanger pipes in said vertical plane, said tube cooperating with said pipes to form a passageway within said vertical plane for the flow of air from said source through the lower end of said lower hanger pipe, and air diffusing means connected to the lower end of said lower hanger pipe.

2. A swing diffuser comprising a rigid upper hanger pipe adapted to be connected to a source of air under pressure, a rigid lower hanger pipe, a flexible tube connecting the upper end of said lower hanger pipe to the lower end of said upper hanger pipe to provide an air passageway therethrough, said flexible tube holding said lower hanger pipe in vertical alignment with its upper end, a pivoted guide member connected to said upper and lower hanger pipes to provide a mechanical connection between said pipes, said guide member comprising an upper section rigidly secured to said upper hanger pipe, a lower section rigidly secured to said lower hanger pipe, and a pivot pin interconnecting the upper and lower sections of said guide member, said guide member holding said upper and lower hanger pipes in a common vertical plane in all positions of said upper and lower hanger pipes, and air diffusing means connected to the lower end of said lower hanger pipe.

3. A swing diffuser comprising a stationary anchor member positioned near a source of air under pressure, a rigid upper hanger pipe, a flexible tube adapted to connect the upper end of said pipe to said source of air under pressure, a guide member pivotally secured to said anchor member means connecting said pipe to said guide member for pivotal movement with said guide member, a rigid lower hanger pipe, a flexible tube connecting the upper end of said lower hanger pipe to the lower end of said upper hanger pipe, and air diffusing means connected to the lower end of said lower hanger pipe.

4. A swing diffuser comprising a stationary anchor member positioned near a source of air under pressure, a rigid upper hanger pipe, a flexible tube adapted to connect the upper end of said pipe to said source of air under pressure, a guide member pivotally secured to said anchor member and rigidly connected to said pipe for controlling the movement of said pipe, a rigid lower hanger pipe, the upper end of said lower hanger pipe being connected to the lower end of said upper hanger pipe, air diffusing means connected to the lower end of said lower hanger pipe, linkage pivotally connected to said guide member, and means operatively connecting said linkage to said lower hanger pipe, said last mentioned means causing said lower hanger pipe to move in predetermined relation to said upper hanger pipe when said upper hanger pipe is moved in a vertical plane.

5. A swing diffuser comprising a rigid upper hanger pipe, a flexible tube adapted to connect said upper hanger pipe to a source of air under pressure, a rigid lower hanger pipe, a second flexible tube connecting the upper end of said lower hanger pipe to the lower end of said upper hanger pipe, said hanger pipes and flexible tubes being in a common vertical plane, means for pivotally mounting said upper hanger pipe, means for keeping said hanger pipes in said common vertical plane in all positions of said hanger pipes while permitting relative movement therebetween, and air diffusing means connected to the lower end of said lower hanger pipe.

6. A swing diffuser comprising a rigid upper hanger pipe, a flexible tube adapted to connect said upper hanger pipe to a source of air under pressure, a rigid lower hanger pipe, a second flexible tube connecting the upper end of said lower hanger pipe to the lower end of said upper hanger pipe and a pivoted guide member comprising a rigid member secured to the lower end of said upper hanger pipe and a pivoted guide member comprising a rigid member secured to the lower end of said upper hanger pipe, a second rigid member secured to the upper end of said lower hanger pipe, means pivotally connecting said rigid members, said guide member being effective to restrict the relative movement between said upper and lower hanger pipes to a common vertical plane, and air diffusing means connected to the lower end of said lower hanger pipe.

7. A swing diffuser comprising a rigid upper hanger pipe, a flexible tube adapted to connect said upper hanger pipe to a source of air under pressure, a fixed pivot, means pivotally connecting said upper hanger pipe to said fixed pivot for pivotal movement about said fixed pivot in a vertical plane, a rigid lower hanger pipe, a second flexible tube connecting the upper end of said lower hanger pipe to the lower end of said upper hanger pipe, a guide member pivoted intermediate its length and secured to the lower end of the upper hanger pipe and to the upper end of the lower hanger pipe for controlling the movement of said lower hanger pipe when said upper hanger pipe is moved vertically about said fixed pivot, and air diffusing means connected to said lower hanger pipe.

8. A swing diffuser comprising a rigid upper hanger pipe, a flexible tube adapted to connect said upper hanger pipe to a source of air under pressure, a stationary anchor member adjacent said flexible tube, means pivotally secured to said anchor member and engaging said upper hanger pipe for movement therewith, a rigid lower hanger pipe, a second flexible tube connecting the upper end of said lower hanger pipe to the lower end of said upper hanger pipe, a guide member secured to said lower hanger pipe, a rigid control bar pivotally secured at one end to said guide member, pivotal linkage connecting the other end of said control bar to said means, and air diffusing means connected to the lower end of said lower hanger pipe.

9. A swing diffuser adapted to be mounted in a tank, said diffuser comprising a rigid upper hanger pipe connected to a source of air under pressure, a pin fixed adjacent said pipe, means pivotally mounted on said pin and connected to said pipe for controlling the direction of movement of said pipe, a rigid lower hanger pipe, an air diffuser header secured to said lower hanger pipe, a supporting leg depending from said header, a flexible tube connecting the upper end of said lower hanger pipe to the lower end of said upper hanger pipe, a guide member engaging said lower hanger pipe for controlling the movement of said header and said leg, a rigid control bar pivotally connected at one end to said guide member, and a linkage comprising a plurality of pivotally interconnected links providing a pivotal connection between the other end of said control bar and said means, whereby said header and leg are moved in a predetermined path as said upper hanger pipe is moved relative to said pin, means including said links for causing said leg to engage the bottom of the tank in which said diffuser is mounted before said upper hanger pipe reaches its lowermost position when said upper hanger pipe is moved downwardly, and means including said links for causing said diffuser to move past the dead center between said pin and the point of engagement of said leg with the bottom of said tank upon continued downward movement of said upper hanger pipe after said leg engages the bottom of said tank, to lock said supporting leg against accidental displacement.

10. A swing diffuser adapted to be mounted in a tank, said diffuser comprising a rigid upper hanger pipe, a rigid lower hanger pipe, a diffuser header secured to said lower hanger pipe, a supporting leg depending from said header, two pivots fixed in spaced relationship, means operatively connecting said upper hanger pipe to one of said fixed pivots for pivotal movement in a vertical plane, a linkage comprising a plurality of pivotally interconnected links, one of said links being pivotally connected to said other fixed pivot, means operatively connecting said linkage to said lower hanger pipe, and means pivotally interconnecting said hanger pipes for moving said header to a position adjacent the floor of a tank in which said swing diffuser is mounted as said upper hanger pipe is moved downwardly, said means causing said linkage and said last mentioned leg to move arcuately until it reaches the proximity of its lowermost position and then causing said leg to move vertically downwardly into its final bearing position, said leg, said linkage and said last mentioned means being so arranged that said leg reaches its final bearing position before said upper hanger pipe reaches its lowermost position, said linkage and said last mentioned means causing said header to move past a dead center position after said leg is in its final bearing position, to hold said leg against displacement.

11. A swing diffuser comprising a fixed member, a fixed pivot in said member, a bridle pivotally mounted on said fixed pivot for supporting an upper hanger pipe, an upper hanger pipe rigidly secured at its upper end to said bridle, a lower hanger pipe pivotally connected to said upper hanger pipe, a diffuser header secured to said lower hanger pipe and having an operating and a servicing position, a control bar pivotally connected to the lower hanger pipe, a first link pivotally connected to said control bar, a second link pivotally connected to said first link and pivotally connected to said bridle, and means whereby said last mentioned pivotal connection moves to or slightly beyond a dead center position on a line projected through said fixed pivot and the pivotal connection between said first and second links as said header moves from the servicing to the operating position.

12. A swing diffuser adapted to be mounted in a tank, a stationary anchor member adapted to be mounted adjacent the upper edge of a tank in which the swing diffuser is to be mounted, said diffuser comprising a bridle pivotally secured to said stationary anchor, a rigid upper hanger pipe adapted to be connected to a source of air under pressure and rigidly secured to said bridle, a rigid lower hanger pipe, an air diffuser header secured to said lower hanger pipe, a flexible tube connecting the upper end of said lower hanger pipe to the lower end of said upper hanger pipe, a guide member comprising a rigid upper section secured to said upper hanger pipe and a rigid lower section secured to said lower hanger pipe, said upper and lower sections being pivotally connected, a rigid control bar pivotally connected at one end to said guide member, a linkage comprising a plurality of pivotally interconnected links, one of said links being pivotally connected to the other end of said control bar, another of said links being pivotally connected to said stationary anchor member, and means whereby both pivot points of said control bar, the pivot between the upper and lower sections of said guide member, and the pivot between said upper hanger pipe and said stationary anchor member move into mutual alignment at an intermediate raised position of said diffuser above the liquid level of the tank in which said diffuser is mounted, as said diffuser is moved between its uppermost and lowermost positions.

13. A swing diffuser comprising a rigid upper hanger pipe, a flexible tube adapted to connect said upper hanger pipe to a source of air under pressure, a stationary anchor member adjacent said flexible tube, means pivotally secured to said anchor member and engaging said upper hanger pipe for movement therewith, a rigid lower hanger pipe, a second flexible tube connecting the upper end of said lower hanger pipe to the lower end of said upper hanger pipe, a guide member secured to said lower hanger pipe, a rigid control bar pivotally secured at one end to said guide member, pivotal linkage connecting the other end of said control bar to said means, and air diffusing means connected to the lower end of said lower hanger pipe.

References Cited in the file of this patent

UNITED STATES PATENTS

| | | |
|---|---|---|
| 1,219,049 | Sticklin | Mar. 13, 1917 |
| 1,539,047 | Hutchinson | May 26, 1925 |
| 2,521,454 | Dressler | Sept. 5, 1950 |
| 2,527,097 | Katow | Oct. 24, 1950 |
| 2,650,810 | Nordell | Sept. 1, 1953 |
| 2,663,178 | Schwartz | Dec. 22, 1953 |
| 2,825,541 | Noll et al. | Mar. 4, 1958 |

FOREIGN PATENTS

| | | |
|---|---|---|
| 346,270 | Great Britain | Apr. 7, 1931 |
| 614,617 | Canada | Feb. 14, 1961 |